(12) United States Patent
An et al.

(10) Patent No.: US 7,623,881 B2
(45) Date of Patent: Nov. 24, 2009

(54) METHOD OF TRANSMITTING BROADCAST MESSAGE IN A MOBILE COMMUNICATION SYSTEM

(75) Inventors: Jong Hoe An, Seoul (KR); Young Jun Kim, Anyang-si (KR); Chan Ho Kyung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 426 days.

(21) Appl. No.: 11/366,873

(22) Filed: Mar. 2, 2006

(65) Prior Publication Data

US 2006/0209748 A1    Sep. 21, 2006

(30) Foreign Application Priority Data

| Mar. 2, 2005 | (KR) | ...................... 10-2005-0017442 |
| Mar. 28, 2005 | (KR) | ...................... 10-2005-0025582 |
| Apr. 16, 2005 | (KR) | ...................... 10-2005-0031736 |

(51) Int. Cl.
*H04B 7/00* (2006.01)
*H04W 4/00* (2009.01)

(52) U.S. Cl. ...................................... 455/515; 370/331
(58) Field of Classification Search .................. 455/515
See application file for complete search history.

(56) References Cited

U.S. PATENT DOCUMENTS

| 5,909,651 | A | 6/1999 | Chander et al. |
| 6,826,408 | B1 * | 11/2004 | Kim et al. .................... 455/466 |
| 7,403,790 | B2 * | 7/2008 | Balachandran et al. ....... 455/518 |
| 2002/0051442 | A1 * | 5/2002 | Lee et al. ..................... 370/345 |
| 2003/0114156 | A1 | 6/2003 | Kinnavy et al. |
| 2003/0174674 | A1 * | 9/2003 | Lee et al. ..................... 370/331 |
| 2004/0203702 | A1 | 10/2004 | Burgess et al. |
| 2005/0036464 | A1 | 2/2005 | Rajkotia et al. |

FOREIGN PATENT DOCUMENTS

KR    2001018231    3/2001

* cited by examiner

*Primary Examiner*—Vincent P Harper
*Assistant Examiner*—Marivelisse Santiago-Cordero
(74) *Attorney, Agent, or Firm*—Lee, Hong, Degerman, Kang & Waimey

(57) ABSTRACT

A method of transmitting a broadcast message using a Forward Common Control Channel (F-CCCH) in a wireless communication system is disclosed. More specifically, a base station determines whether a periodic enhanced broadcast page is enabled or disabled, and then transmits at least one broadcast message via a first slot of a broadcast paging cycle of the F-CCCH if determined that the periodic enhanced broadcast page is enabled.

9 Claims, 4 Drawing Sheets

METHOD OF TRANSMITTING BROADCAST MESSAGE IN A MOBILE COMMUNICATION SYSTEM

This application claims the benefit of Korean Application No. P10-2005-0017442, filed on Mar. 2, 2005, No. P10-2005-0031736 filed on Apr. 16, 2005 and No. P10-2005-0025582, filed on Mar. 28, 2005, which are hereby incorporated by reference.

BACKGROUND OF THE INVENTION

1. Field of the Invention

The present invention relates to a method of transmitting a broadcast message, and more particularly, to a method of transmitting a broadcast message in a mobile wireless communication system.

2. Discussion of the Related Art

A broadcast message uses a data burst message to transmit data to all or specific groups of mobile stations. At the same time, the mobile stations are in a specified mode when receiving the broadcast message.

If the broadcast message is transmitted via a Forward Common Control Channel (F-CCCH) and a Secondary Broadcast Control Channel (S-BCCH), control information of the broadcast message to be transmitted is sent via the F-CCCH. For example, the control information includes information related to whether the broadcast message has been transmitted, and Enhanced Broadcast Page information which indicates the location of the broadcast message transmitted on the S-BCCH.

According to the conventional method, the aforementioned broadcast message is transmitted via the S-BCCH. More specifically, the broadcast message is not transmitted via a Primary Broadcast Control Channel (P-BCCH), which is used to transmit an overhead message only, nor via the F-CCCH. However, the Enhanced Broadcast Page information can be transmitted using a Multi-slot Enhanced Broadcast Paging scheme or a Periodic Enhanced Broadcast Paging scheme.

FIG. 1 is an example showing the Multi-Slot Enhanced Broadcast Paging scheme. In detail, the Multi-Slot Enhanced Broadcast Paging scheme is a scheme which transmits the Enhanced Broadcast Page information during F-CCCH slots so that all the mobile stations can receive the broadcast signal. Here, all the mobile stations are in the slotted mode to receive the broadcast signal. As illustrated in FIG. 1, if a Maximum Paging Cycle period of the F-CCCH is 16 slots, the Enhanced Broadcast Page information can be continuously transmitted in the 16 slots. Furthermore, the Enhanced Broadcast Page information can be received by all the mobile stations receiving different slots on the F-CCCH.

FIG. 2 is an example illustrating a Periodic Enhanced Broadcast Paging scheme where a BCAST_INDEX is 1. In FIG. 2, information on whether the Periodic Enhanced Broadcast Paging scheme is being used can be determined by the BCAST_INDEX of a Multi-Carrier Radio Resource (MC-RR) Parameters Message. For example, the value of the BCAST_INDEX represented by '000' indicates that the Periodic Enhanced Broadcast Paging scheme is not used. On the other hand, if the value of the BCAST_INDEX is not '000,' then the Periodic Enhanced Broadcast Paging scheme having (B+7) broadcast paging cycle period is being used. Here, the value of 'B' can be determined according to Equation 1.

$$B = 2^{1+i} \times 16 \quad 1 \leq i \leq 7 \qquad \text{Equation 1}$$

In Equation 1, i represents a value of the BCAST_INDEX transmitted via the MC-RR parameters message.

In FIG. 2, the value of the BCAST_INDEX is '1' and when applied to Equation 1, the value of B is 64 and the broadcast paging cycle is 71. The Enhanced Broadcast Page information is transmitted via a first F-CCCH slot of the broadcast paging cycle, and the Enhanced Broadcast Page information includes BCCH_INDEX and TIME_OFFSET. Consequently, transmission locations of the S-BCCH and the broadcast message can be identified by the Enhanced Broadcast Page information.

A plurality of BCCH is classified into Broadcast Control Channel Number (BCN). In detail, the BCN value of the P-BCCH is 1, and the BCN value of the S-BCCH can be any number between 2~8. The broadcast message is transmitted via the S-BCCH after 40×(1+TIME_OFFSET)ms with respect to the transmission point of the Enhanced Broadcast Page information. Here, the BCN value of the S-BCCH is BCCH_INDEX+1.

As described above, in order to transmit a broadcast message, Enhanced Broadcast Page information, which provides information on whether the broadcast message is to be transmitted and the transmission location of the broadcast message, has to be first transmitted via the F-CCCH. Thereafter, the actual broadcast message is transmitted via the S-BCCH. However, the problem with this transmission scheme is that the actual broadcast message cannot be transmitted via the F-CCCH.

SUMMARY OF THE INVENTION

Accordingly, the present invention is directed to a method of transmitting broadcast message in a mobile wireless communication system that substantially obviates one or more problems due to limitations and disadvantages of the related art.

An object of the present invention is to provide a method of transmitting a broadcast message using a Forward Common Control Channel (F-CCCH) in a wireless communication system where a plurality of broadcast messages are transmitted via a first slot of a broadcast paging cycle.

Another object of the present invention is to provide a method of transmitting a broadcast message using a Forward Common Control Channel (F-CCCH) in a wireless communication system where a single broadcast message is transmitted via at least one slot of a broadcast paging cycle.

A further object of the present invention is to provide a method of transmitting a broadcast message using a Forward Common Control Channel (F-CCCH) in a wireless communication system where at least one broadcast paging message is transmitted via at least one slot of a broadcast paging cycle.

Another object of the present invention is to provide a method of transmitting a broadcast message using a Forward Common Control Channel (F-CCCH) in a wireless communication system where at least one broadcast message included in each slot of the maximum paging cycle is transmitted.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a broadcast message using a Forward Common Control Channel (F-CCCH) in a wireless communication system includes a base station which determines whether a periodic enhanced broadcast page is enabled or disabled, and then transmits at least one broadcast message via a first slot of a broadcast paging cycle of the F-CCCH if determined that the periodic enhanced broadcast page is enabled.

In another aspect of the present invention, a base station determines whether a periodic enhanced broadcast paging is enabled or disabled, and then transmits a single broadcast message via at least one slot of a broadcast paging cycle of the F-CCCH if determined that the periodic enhanced broadcast paging is enabled.

Yet, in another aspect of the present invention, a base station first determines whether a periodic enhanced broadcast paging is enabled or disabled. Thereafter, the base station transmits at least one broadcast paging message via at least one slot of a boradcast paging cycle of the F-CCCH if determined that the periodic enhanced broadcast paging is enabled, and also transmits at least one broadcast message in a subsequent broadcast slot according to an order of the broadcast paging message.

In another aspect of the present invention, a base station transmits a maximum slot cycle index for providing the broadcast message to a mobile station and receives the maximum slot cycle index and determining a maximum paging cycle. Thereafter, the base station transmits at least one broadcast message included in each slot of the maximum paging cycle of the F-CCCH, and then receives the at least one broadcast message in a specified slot of the maximum paging cycle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A mobile station (MS) should know whether or not the S-BCCH used for transmitting a broadcast message is supported. The MS can determine whether the S-BCCH is supported or not based on the value of the NUM_BCCH_BCAST included in the MC-RR parameters message. For example, if the NUM_BCCH_BCAST value is '000,' the MS can determine that the S-BCCH is not supported. On the contrary, if the NUM_BCCH_BCAST value is not '000,' then not only can the MS can determine that the S-BCCH is supported, but the number of the S-BCCH supported can also be determined since the S-BCCH supported number equals the value of the NUM_BCCH_BCAST.

The present invention can be applied to cases where the NUM_BCCH_BCAST value is '000' and as a result, does not support the S-BCCH for transmitting a broadcast message. In situations where the S-BCCH is unsupported, two transmission schemes can be used, namely, a Multi-slot Broadcast Message transmission scheme, and a Periodic Enhanced Broadcast Paging transmission scheme.

Figure 1:
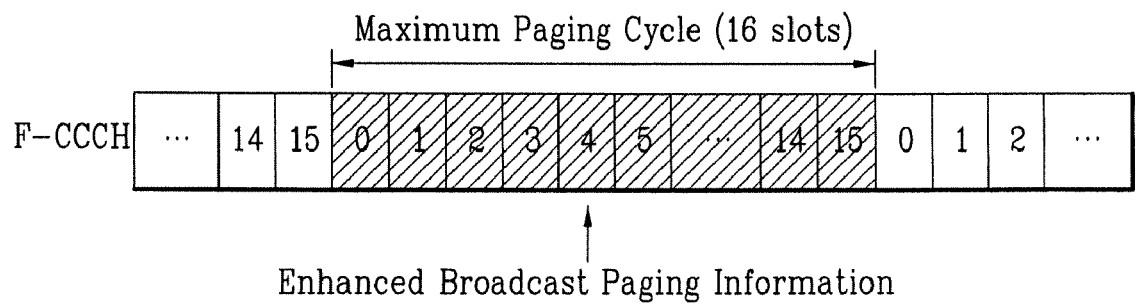
FIG. 1 is an example showing the Multi-Slot Enhanced Broadcast Paging scheme.
Figure 2:
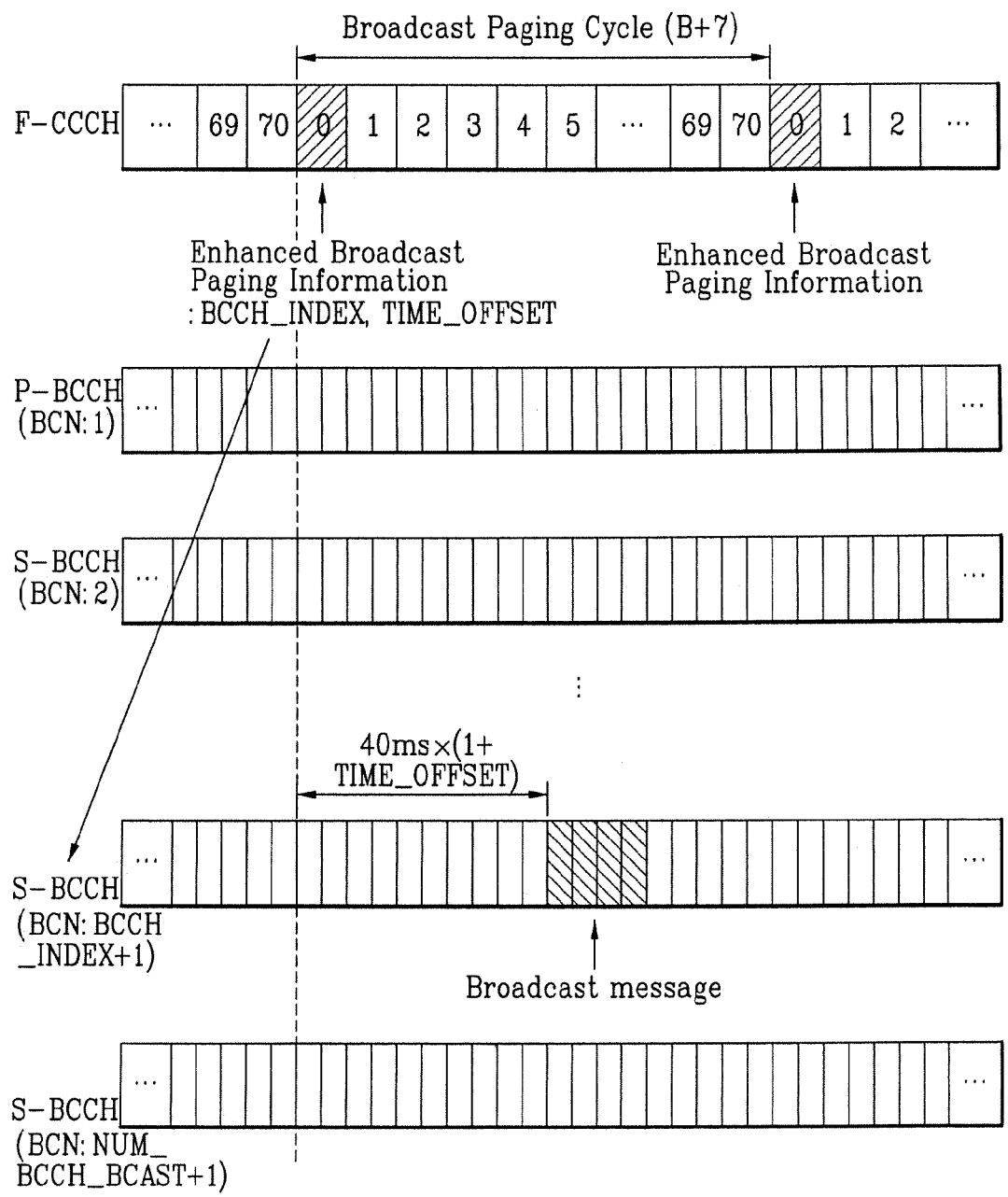
FIG. 2 is an example illustrating a Periodic Enhanced Broadcast Paging scheme where a BCAST_INDEX is 1.
Figure 3:
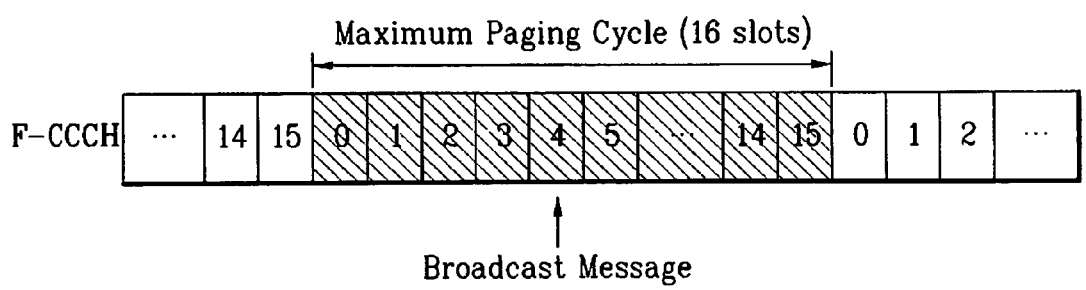
FIG. 3 is an example illustrating the Multi-slot Broadcast Message transmission scheme having a maximum paging cycle of 16 slots.

FIG. 3 is an example illustrating the Multi-slot Broadcast Message transmission scheme having a maximum paging cycle of 16 slots. The maximum paging cycle is a paging channel slot cycle having a duration M slots, such that $M=2^i \times 16$, $0 \leq i \leq 7$, where i=MAX_SLOT_CYCLE_INDEX as received in a system parameters message. As illustrated in FIG. 3, the Multi-Slot Broadcast Message transmission scheme is a scheme in which the broadcast message is transmitted in a sufficient number of assigned slots on the F-CCCH such that the broadcast message may be received by all mobile stations that are operating in the slotted mode. For example, the base station may transmit the broadcast message in N successive paging slots, where N is the number of slots in a maximum paging cycle. Furthermore, the Multi-slot Enhanced Broadcast Paging scheme can be applied to cases where the broadcast message fits in a single slot. Here, the base station may send the broadcast message without regard to whether a broadcast paging message, such as periodic enhanced broadcast paging, is enabled or disabled.

If a base station (BS) consecutively transmits the broadcast message using 16 slots via the F-CCCH, each MS can successfully receive the broadcast message even if each MS in a cell receives the broadcast message via different slots of the F-CCCH.

In a Periodic Enhanced Broadcast Paging transmission method, mobile stations can be configured to receive broadcast messages by monitoring a specific broadcast slot, namely, the first slot of a broadcast paging cycle. Furthermore, if a plurality of broadcast messages to be transmitted fit within the first slot of a broadcast paging cycle, they may all be transmitted in this first broadcast slot. However, if a single broadcast message to be transmitted occupies more than one slot, the broadcast message may be transmitted beginning with the first broadcast slot.

Figure 4:
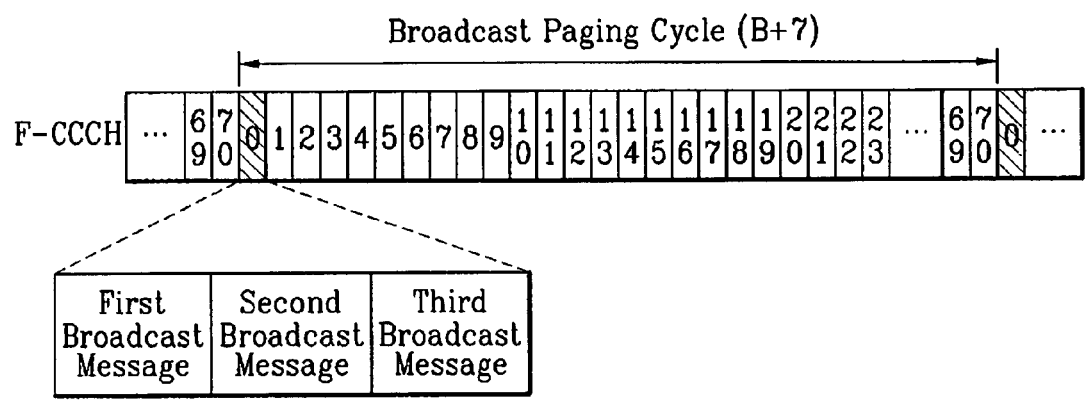
FIG. 4 is an example illustrating a Periodic Enhanced Broadcast Paging transmission scheme according to a first embodiment of the present invention.

FIG. 4 is an example illustrating a Periodic Enhanced Broadcast Paging transmission scheme according to a first embodiment of the present invention. In FIG. 4, a value of the BCAST_INDEX, transmitted via a MC-RR parameter message, is '1,' and three (3) broadcast messages are transmitted via a single slot. If plurality of broadcast messages is transmitted via a single slot, the broadcast message can be transmitted in the first slot of the next broadcast paging cycle. In addition, in the present embodiment, it is unnecessary to independently transmit Enhanced Broadcast Page or put differently, information pertaining to the slot used to transmit the broadcast message via the F-CCCH. Furthermore, the S-BCCH is not used.

Figure 5:
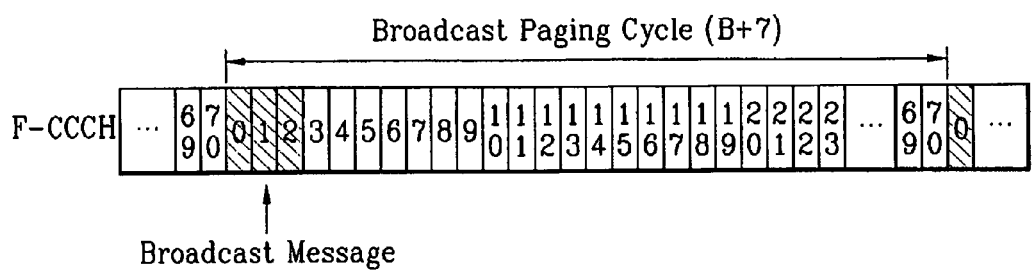
FIG. 5 is an example illustrating a Periodic Enhanced Broadcast Paging transmission scheme according to a second embodiment of the present invention.

FIG. 5 is an example illustrating a Periodic Enhanced Broadcast Paging transmission scheme according to a second embodiment of the present invention. In FIG. 5, a value of the BCAST_INDEX, transmitted via a MC-RR parameters message, is '1,' and the size of a broadcast message occupies three (3) slots. As illustrated in FIG. 5, if there is only one broadcast message to be transmitted and the broadcast message has to be transmitted using three slots, the broadcast message can be transmitted using three consecutive slots, starting with a first slot of the next broadcast paging cycle. In this embodiment, as is the case with the first embodiment, it is unnecessary to independently transmit Enhanced Broadcast Page. Furthermore, the S-BCCH is not used.

Figure 6:
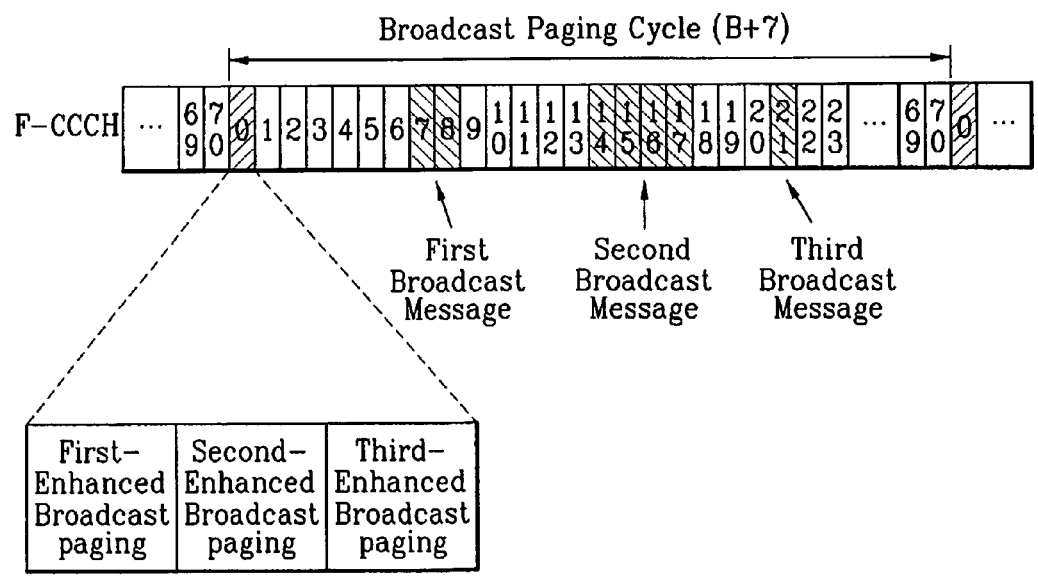
FIG. 6 is an example illustrating a Periodic Enhanced Broadcast Paging transmission scheme according to a third embodiment of the present invention.

FIG. 6 is an example illustrating a Periodic Enhanced Broadcast Paging transmission scheme according to a third embodiment of the present invention. In FIG. 6, a value of the BCAST_INDEX, transmitted via a MC-RR parameter message, is '1,' and there are three broadcast messages to be transmitted. As such, the first slot (i.e., slot 0) includes three broadcast paging messages (i.e., enhanced broadcast pages) to be transmitted. Here, each enhanced broadcast page is associated with subsequent broadcast slots. For each enhanced broadcast page, an associated broadcast message may be transmitted in the associated subsequent broadcast slot. As depicted in the figure, the first enhanced broadcast page is associated with a first broadcast message which occupies slots 7-8. Also, the second and third enhanced broadcast pages are associated with the second and third broadcast messages which occupy slots 14-17 and slot 21, respectively.

The broadcast slots for the associated broadcast message are determined according to a time offset specified in the enhanced broadcast page. In addition, broadcast slots for a repeat of the broadcast message can be specified via a time offset from the slot of the first broadcast message.

In short, in the present embodiment, as described above, there is at least one broadcast message to be transmitted, and the size of each broadcast message may exceed permitted size for each slot. As illustrated in FIG. 6, in the first slot of the next broadcasting paging cycle, an enhanced broadcast page, which provides whether the broadcast message is transmitted as well as the location of the broadcast messages on the F-CCCH, is transmitted. Here, the S-BCCH is not used.

Furthermore, the broadcast message corresponding to each enhanced broadcast page should be transmitted after 'n' number of slots. That is, a first broadcast message corresponding to a first Enhanced Broadcast Page is transmitted after 'n' slots, a second broadcast message corresponding to a second Enhanced Broadcast Page is transmitted after '2n' slots, a third broadcast message corresponding to a third Enhanced Broadcast Page is transmitted after '3n' slots, and k-th broadcast message corresponding to k-th Enhanced Broadcast Page is transmitted after 'k×n' slots.

FIG. 6 illustrates an example where n=7. In FIG. 6, since there are three broadcast messages to be transmitted and n=7, the first broadcast message corresponding to the first Enhanced Broadcast Page is transmitted after 7 slots, the second broadcast message corresponding to the first Enhanced Broadcast Page is transmitted after 14 slots, the third broadcast message corresponding to the third Enhanced Broadcast Page is transmitted after 21 slots, and so forth.

The Enhanced Broadcast Page information can be transmitted via a General Page Message (GPM) or an Universal Page Message (UPM). The following Table 1 is an example of a GPM format according to the present invention.

TABLE 1

| Field | Length (bits) |
|---|---|
| GPM Common Fields: | |
| CONFIG_MSG_SEQ | 6 |
| ACC_MSG_SEQ | 6 |
| CLASS_0_DONE | 1 |
| CLASS_1_DONE | 1 |
| TMSI_DONE | 1 |
| ORDERED_TMSIS | 1 |
| BROADCAST_DONE | 1 |
| RESERVED | 4 |
| ADD_LENGTH | 3 |
| ADD_PFIELD | 8 × ADD_LENGTH |
| PDU Format for a mobile station-addressed page: | |
| SERVICE_OPTION | 0 or 16 |
| PDU Format for broadcast Page: There is no Layer 3 field associated with this record. | |
| PDU Format for an enhanced broadcast page when NUM_BCCH_BCAST ≠ '000': | |
| BCCH_INDEX | 3 |
| TIME-OFFSET | 10 |
| REPEAT_TIME_OFFSET | 0 or 5 |
| ADD_BCAST_RECORD | 0 or 8 × EXT_BCAST_SDU_LENGTH |

PDU Format for an enhanced broadcast page when NUM_BCCH_BCAST='000'; There are no Layer 3 fields associated with this record.

Table 2 is an example of a UPM format according to the present invention.

TABLE 2

| Field | Length (bits) |
|---|---|
| UPM Common Field: | |
| CONFIG_MSG_SEQ | 6 |
| ACC_MSG_SEQ | 6 |
| READ_NEXT_SLOT | 1 |
| READ_NEXT_SLOT_BCAST | 1 |
| PDU Format for a mobile station-addressed page: | |
| SERVICE_OPTION | 0 or 16 |
| ADD_MS_RECORD | 0 or * × EXT_BCAST_SDU_LENGTH |
| PDU Format for a mobile station-directed message announcement: There are no Layer 3 fields associated with this record. | |
| PDU Format for an enhanced broadcasts page when NUM_BCCH_BCAST ≠ '000': | |
| BCCH_INDEX | 3 |
| TIME-OFFSET | 10 |
| REPEAT_TIME_OFFSET | 0 or 5 |
| ADD_BCAST_RECORD | 0 or 8 × EXT_BCAST_SDU_LENGTH |

PDU Format for an enhanced broadcast page when NUM_BCCH_BCAST='000'; There are no Layer 3 fields associated with this record.

As shown in Tables 1 and 2, when the value of NUM_BCCH_BCAST is not '000,' the S-BCCH is available to transmit the broadcast message, and therefore, information for receiving the S-BCCH is transmitted. On the contrary, if the value of NUM_BCCH_BCAST is '000,' there is no S-BCCH by which to transmit the broadcast message. As such, the broadcast message is transmitted via the F-CCCH, and it is unnecessary to transmit information pertaining to the broadcast information.

Table 3 is another example of a GPM format according to the present invention.

TABLE 3

| Field | Length (bits) |
|---|---|
| GPM Common Fields: | |
| CONFIG_MSG_SEQ | 6 |
| ACC_MSG_SEQ | 6 |
| CLASS_0_DONE | 1 |
| CLASS_1_DONE | 1 |
| TMSI_DONE | 1 |
| ORDERED_TMSIS | 1 |
| BROADCAST_DONE | 1 |
| RESERVED | 4 |
| ADD_LENGTH | 3 |
| ADD_PFIELD | 8 × ADD_LENGTH |
| PDU Format for a mobile station-addressed page: | |
| SERVICE_OPTION | 0 or 16 |
| PDU Format for broadcast Page: There is no Layer 3 field associated with this record. | |
| PDU Format for an enhanced broadcast page: | |
| BCCH_INDEX | 3 |
| TIME-OFFSET | 10 |
| REPEAT_TIME_OFFSET | 0 or 5 |
| ADD_BCAST_RECORD | 0 or 8 × EXT_BCAST_SDU_LENGTH |

A field corresponding to 'PDU Format for an enhanced broadcast page' in Table 3 can include different information depending on whether the S-BCCH is supported. In other words, different information can be included depending on whether the value of NUM_BCCH_BCAST is '000' or not. For example, if the value of NUM_BCCH_BCAST is not '000,' the BS sets the value of the field corresponding to 'PDU Format for an enhanced broadcast page' to a valid value depending on the transmission format of the broadcast message. At the same time, the MS uses the valid value transmitted from the BS to receive the broadcast message.

Alternatively, if the value of NUM_BCCH_BCAST is '000,' the BS can set the value of the field corresponding to 'PDU Format for an enhanced broadcast page' as an unused value or an insignificant default value. In such a case, the MS determines that the value of the field is an invalid value and therefore does not use the value to receive the broadcast message.

For example, if NUM_BCCH_BCAST value is '000,' the BS can set the value of the BCCH_INDEX as currently unused value. At the same time, the BS can set the value of TIME_OFFSET to be an insignificant value such as '0000000000.' In addition, the value of the REPEAT_TIME_OFFSET and the value of ADD_BCAST_SDU_LENGTH can be excluded by setting the value of EXT_BCAST_SDU_LENGTH_IND to '00.'

Table 4 is another example of a UPM according the present invention.

TABLE 4

| Field | Length (bits) |
|---|---|
| UPM Common Field: | |
| CONFIG_MSG_SEQ | 6 |
| ACC_MSG_SEQ | 6 |
| READ_NEXT_SLOT | 1 |
| READ_NEXT_SLOT_BCAST | 1 |
| PDU Format for a mobile station-addressed page: | |
| SERVICE_OPTION | 0 or 16 |
| ADD_MS_RECORD | 0 or * × EXT_BCAST_SDU_LENGTH |

TABLE 4-continued

| Field | Length (bits) |
|---|---|
| PDU Format for a mobile station-directed message announcement: There are no Layer 3 fields associated with this record. | |
| PDU Format for an enhanced broadcasts page: | |
| BCCH_INDEX | 3 |
| TIME-OFFSET | 10 |
| REPEAT_TIME_OFFSET | 0 or 5 |
| ADD_BCAST_RECORD | 0 or 8 × EXT_BCAST_SDU_LENGTH |

A field corresponding to 'PDU Format for an enhanced broadcast page' in Table 4 can include different information depending on whether the S-BCCH is supported. In other words, different information can be included depending on whether the value of NUM_BCCH_BCAST is '000' or not. For example, if the value of NUM_BCCH_BCAST is not '000,' the BS sets the value of the field corresponding to 'PDU Format for an enhanced broadcast page' to a valid value depending on the transmission format of the broadcast message. At the same time, the MS uses the valid value transmitted from the BS to receive the broadcast message.

Alternatively, if the value of NUM_BCCH_BCAST is '000,' the BS can set the value of the field corresponding to 'PDU Format for an enhanced broadcast page' as an unused value or an insignificant default value. In such a case, the MS determines that the value of the field is an invalid value and therefore does not use the value to receive the broadcast message.

For example, if NUM_BCCH_BCAST value is '000,' the BS can set the value of the BCCH_INDEX as currently unused value. At the same time, the BS can set the value o TIME_OFFSET to be an insignificant value such as '0000000000.' In addition, the value of the REPEAT_TIME_OFFSET and the value of ADD_BCAST_SDU_LENGTH can be excluded by setting the value of EXT_BCAST_SDU_LENGTH_IND to '00.'

With respect to the enhanced broadcast page scheme, if the same broadcast message or the same enhanced broadcast page information is to be re-transmitted, the initially transmitted broadcast message or the enhanced broadcast page information should be re-transmitted after a specified time period from the initially transmitted time. For example, the re-transmission should take place within (4×(B+7)) slots of the initial transmission.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting a broadcast message from a base station to one or more mobile stations using a Forward Common Control Channel (F-CCCH) in a wireless communication system in which periodic enhanced broadcast paging is enabled, the method comprising:

transmitting information related to the number of Broadcast Control Channels (BCCHs) used for transmitting broadcast messages to the at least one mobile station;

if the information includes a value which indicates that a BCCH is not supported:

transmitting a plurality of broadcast messages in a first slot of a broadcast paging cycle of the F-CCCH if the plurality of broadcast messages fit in the first slot; and transmitting, if the plurality of broadcast messages do not fit in the first slot, a plurality of broadcast paging messages in the first slot and transmitting the plurality of broadcast messages in at least one subsequent slot of the broadcast paging cycle in accordance with the plurality of transmitted broadcast paging messages, wherein each of the plurality of broadcast paging messages includes different information depending on whether the BCCH is supported or not.

2. The method of claim 1, wherein each of the plurality of broadcast paging messages comprises an enhanced broadcast page.

3. The method of claim 2, wherein each enhanced broadcast page is associated with subsequent broadcast slots.

4. The method of claim 3, wherein the broadcast slots include at least one broadcast message to be transmitted.

5. The method of claim 1, wherein each of the plurality of broadcast messages and the plurality of broadcast paging messages respectively correspond to one another, and wherein a slot associated with each of the plurality of broadcast messages is determined according to a time offset specified in the corresponding broadcast paging message.

6. The method of claim 5, wherein at least one broadcast message associated with at least one broadcast paging message are transmitted after 'n' number of broadcast slots.

7. The method of claim 1, wherein a slot for a repeat of a second broadcast message is specified via a time offset from the slot of a first broadcast message.

8. The method of claim 1, further comprising determining whether the plurality of broadcast messages fit in the first slot of the broadcast paging cycle or not based on the number and size of the plurality of broadcast messages.

9. The method of claim 1, further comprising transmitting a single broadcast message beginning in the first slot of the broadcast paging cycle if only one broadcast message is to be transmitted.

* * * * *